US009982654B2

(12) United States Patent
Ruijter (10) Patent No.: US 9,982,654 B2
(45) Date of Patent: May 29, 2018

(54) WIND TURBINE WITH AN OFFSET SUCTION SIDE

(71) Applicant: Envision Energy (Denmark) ApS, Silkeborg (DK)

(72) Inventor: Wout Ruijter, Silkeborg (DK)

(73) Assignee: Envision Energy (Denmark) ApS, Silkeborg (DK)

( * ) Notice: Subject to any disclaimer, the term of this patent is extended or adjusted under 35 U.S.C. 154(b) by 1236 days.

(21) Appl. No.: 14/068,013

(22) Filed: Oct. 31, 2013

(65) Prior Publication Data

US 2014/0119915 A1  May 1, 2014

(30) Foreign Application Priority Data

Oct. 31, 2012  (DK) .................. 2012 70670

(51) Int. Cl.
*F03D 1/06*  (2006.01)
(52) U.S. Cl.
CPC ......... *F03D 1/0641* (2013.01); *F03D 1/0633* (2013.01); *Y02E 10/721* (2013.01); *Y02E 10/726* (2013.01)
(58) Field of Classification Search
CPC ... F03D 1/0641; F03D 1/0633; Y02E 10/721; Y02E 10/726
See application file for complete search history.

(56) References Cited

U.S. PATENT DOCUMENTS 6,521,727 B2    2/2003  Eilerts et al.
7,832,985 B2*  11/2010  Rochholz .............. F03D 1/0633
                                                             415/4.3
8,241,000 B2*   8/2012  Blanton ................ F03D 1/0641
                                                             416/223 R
2008/0112813 A1  5/2008  Rochholz
2009/0324416 A1* 12/2009  Bonnet ................ F03D 1/0633
                                                             416/223 R

FOREIGN PATENT DOCUMENTS

| CN | 1732340 A | 2/2006 |
| CN | 1963192 A | 5/2007 |
| DE | 201 20 324 U1 | 9/2002 |
| WO | 99/14490 A1 | 3/1999 |
| WO | 2008/131800 A1 | 11/2008 |
| WO | 2012/007058 A1 | 1/2012 |

* cited by examiner

*Primary Examiner* — Dwayne J White
*Assistant Examiner* — Adam W Brown
(74) *Attorney, Agent, or Firm* — James Creighton Wray; Meera P. Narasimhan (57) ABSTRACT

Wind turbine having a wind turbine tower, a nacelle provided on the wind turbine tower, a rotor hub rotatably mounted to the nacelle, and one or more wind turbine blades having a root end to be mounted to the rotor hub, a tip end, and pressure and suction sides connected to each other via a leading edge and a trailing edge. The wind turbine blade has a plurality of cross-sectional profiles arranged according to the surface of the suction side so that the surface of the suction side forms a line having a predetermined curvature which curves towards the pressure side of the wind turbine blade and/or forms an approximately straight line along at least part of the relative length. The line crosses each cross-sectional profile in that point on the pressure side where the maximum relative thickness of that profile perpendicular relative to its chord line is measured.

18 Claims, 6 Drawing Sheets

WIND TURBINE WITH AN OFFSET SUCTION SIDE

BACKGROUND OF THE INVENTION

Field of the Invention

The present invention relates a wind turbine comprising:
a wind turbine tower;
a nacelle provided on the wind turbine tower;
a rotor hub rotatably mounted to the nacelle;
at least one wind turbine blades having a blade root configured to be mounted to the rotor hub and a tip end, where the wind turbine blade further comprises a pressure side and a suction side connected to each other via a leading edge and a trailing edge, and the wind turbine blade having a relative length of 1.

The present invention further relates to a specific method of using the above described wind turbine.

Description of Related Art

During the recent years, the size and power of wind turbines has increased along with the efficiency of the wind turbines. At the same time, the wind turbine blades have increased in size and length and the aerodynamic design has also changed. The wind turbine blade has an airfoil shaped cross-sectional profile where the sizes of the airfoil shaped profiles decrease towards the tip of the wind turbine blade. The wind turbine blade is at the other end configured to be connected to a wind turbine rotor hub where this end typically has a circular cross-sectional profile and a reinforced structure.

Figure 1:
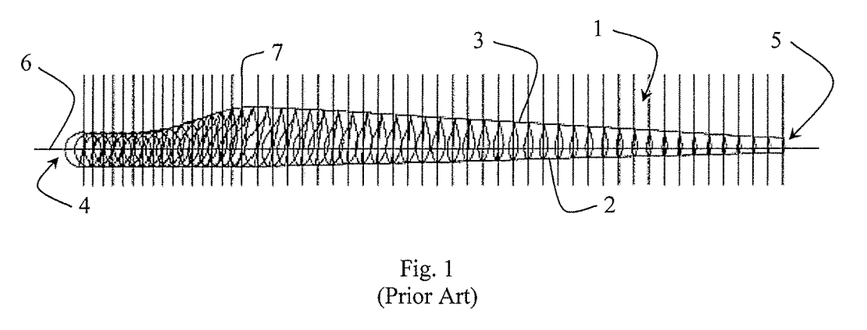
FIG. 1 shows a sketch of an exemplary wind turbine blade having different cross-sectional profiles along the length of the wind turbine blade.
Figure 2:
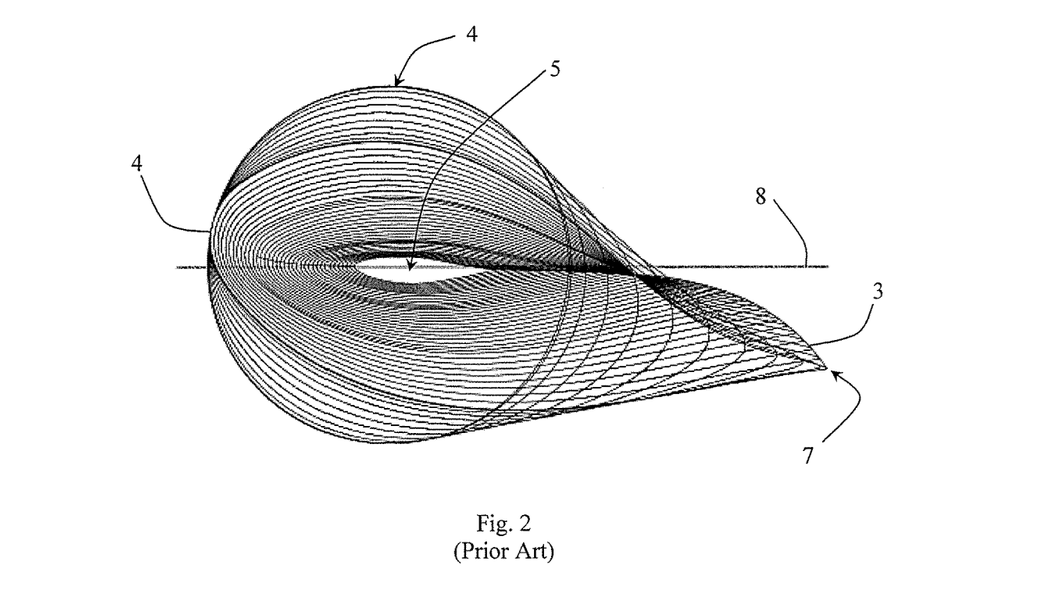
FIG. 2 shows the different cross-sectional profiles shown in FIG. 1 seen from the rotor hub end towards the tip end.
Figure 7:
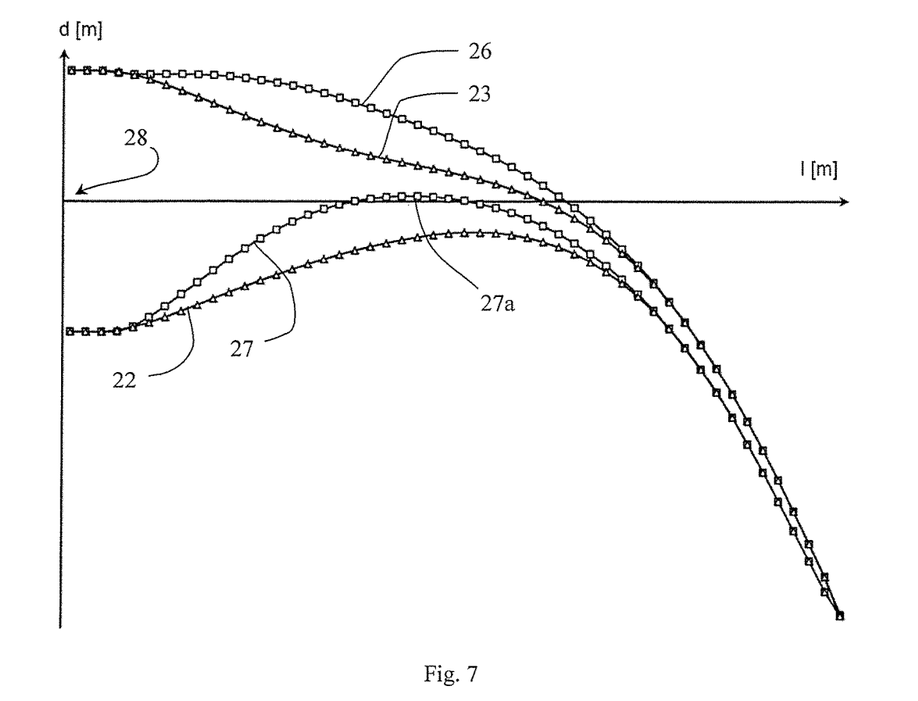
FIG. 7 shows a graph of the position of the suction and pressure sides relative to the length of the wind turbine blade for the two blade profiles shown in FIGS. 5 and 6.

FIG. 1 shows a sketch of an exemplary wind turbine blade 1 having a plurality of cross-sectional profiles along the length of the wind turbine blade. The wind turbine 1 has an aerodynamically shaped configuration which comprises a leading edge 2 and a trailing 3. The wind turbine 1 comprises a blade root 4 configured to be connected to a wind turbine rotor hub (not shown). The free end of the wind turbine 1 is configured as a tip end 5 closing off the aerodynamic profile. The cross-sectional profiles each form an inscribed circle defining a common straight center line 6 extending in a longitudinal direction of the wind turbine blade 1 where the center line 6 is parallel to a rotation plane defined by the wind turbine blades 1. FIG. 2 shows the different cross-sectional profiles seen from the blade root 4 towards the tip end 5. The blade root 4 has a circular shaped profile which changes into a more aerodynamically shaped profile 7 where the size of the aerodynamic profile decreases towards the tip end 5, as shown in the figure, thereby forming a transition area between the two profiles at both the suction and pressure side where the thickness of the profile decreases towards the tip end 5 in a non-linear manner, i.e., forming a concave surface seen from the center line as indicated in FIG. 7. The wind turbine 1 has a twisted longitudinal profile where the chord lines of the different cross-sectional profiles are placed in an increasing/decreasing angle relative to a reference cord line 8, e.g., of the tip end 5, so that the angle of attack is optimized along the length of the wind turbine blade 1. In this configuration, the dominant aerodynamic loading causes the wind turbine blade to bend towards the wind turbine tower. The wind turbine blade will then act as a beam with the suction side in compression and the pressure side in tension. This increases the risk of the wind turbine blade hitting the wind turbine tower and reduces the swept area of the wind turbine blades, thereby reducing the efficiency of the wind turbine. The bending of the wind turbine blades, particularly at the suction side, may lead to waves (buckles) forming in the wind turbine blades causing the blades to fail.

International Patent Application Publication WO 99/14490 A1 and corresponding U.S. Pat. No. 6,582,196 B1 disclose a wind turbine having a number of pre-bent wind turbine blades where the tip end of the wind turbine blades is bent outwards away from the wind turbine tower. The wind acting on the pressure side will press the tip end backwards so that the blade is straightened, thereby increasing the swept area. This configuration has the drawback that the thickness distribution of the blade profile along the length of the wind turbine blade results in a S-shaped main load path forming in the spar cap of the suction side at the transition area, which occurs during wind loads. This may lead to a pre-buckling of the laminate along this spar cap; thus forming an imperfection in the laminate where the deflection may increase infinitely during wind loads. This causes the compression load to be accompanied by local bending loads formed in the laminate along the S-shaped section; this causes earlier failure of the wind turbine blade.

German Utility Model DE 20120324 U1 discloses a wind turbine with three wind turbine blades each having in the span-wise direction of the blade a straight surface at the pressure side and a concave surface at the suction side. The blade forms at the transition area a relative large convex section followed by a relative large concave section which define the main load path in the suction side. This will increase the compression load at the suction side and thus the bending loads in these sections due to the wind loads acting on the wind turbine blade. This increases the risk of the laminate buckling and causing a failure.

U.S. Pat. No. 7,832,985 B2 discloses a wind turbine having a number of pre-bent wind turbine blades. The cross-sectional profiles of the wind turbine blades have a thickness distribution that decreases linearly towards the tip end for reducing the compression loads. This forms a straight surface at both the pressure and suction sides. The cross-sectional profiles are aligned according to the center line extending along the length of the wind turbine blade where a portion of the center line is placed in an acute angle relative to the center line at the blade root. This blade profile does not specify the thickness or the slenderness of the innermost section of the wind turbine blade.

SUMMARY OF THE INVENTION

An object of this invention is to provide an improved turbine blade design reducing the stress in the wind turbine blade during operation.

An object of this invention is to provide a wind turbine blade with minimal curvature of the blade laminates that experience compression loadings during normal operation.

An object of the invention is to provide a wind turbine blade that eliminates the generating of local bending loads in the main compression load path during wind loads.

An object of the invention is to provide a wind turbine blade providing a higher strength to weight ratio.

An object of the invention is achieved by a wind turbine characterized in that
the wind turbine blade further comprises a plurality of cross-sectional profiles arranged along a relative length of wind turbine blade, where the peripheries of the cross-sectional profiles define an outer surface of the suction side and an outer surface of the pressure side; and the cross-sectional profiles are aligned according to the outer surface of the suction side so that the outer surface of the suction side forms a first line having at least one predetermined finite curvature, where the first line extending along the middle of at least one support element arranged along the length of the outer surface of the suction side, and where a center of at least one circle inscribed in each of the cross-sectional profiles form a center line that is offset relative to the center of the blade root in a direction towards the suction side.

This configuration allows the wind turbine blade to have an improved blade design, reducing the stress generated in the wind turbine blade during operation, and increases the blade strength. The aerodynamic cross-sectional profiles are offset relative to the blade root and aligned according to the outer surface of the suction side instead of being aligned according to the center line at the blade root. The alignment is seen from the leading edge along the length of the wind turbine blade. The outer surface of the suction side forms a line, i.e., the first line, extending along the middle, i.e., the center line, of the spar caps extending from the blade root to the tip end. The line may be defined as a curved line having one or more curvatures where the line curves towards the pressure side and/or defined as a straight line. This allows the spar cap at the suction side to be formed as a straight spar cap or a spar cap curving towards to the pressure side. The curvature of the spar cap may be defined by one, two or more inscribed circles where the centers of the inscribed circles are located towards the pressure side.

By aligning the cross-sectional profiles according to the suction side, the S-shaped main compression load path normally occurring in the spar caps at the suction site is straightened out. The center line extends through the cross-sectional profiles of the wind turbine blade and is thereby offset towards the suction side so that it forms a more or less concave or S-shaped line seen from the suction side. The center line may be offset as function of the relative length of the wind turbine blade. This eliminates the local bending loads normally occurring in the suction side, thereby distributing the compression force more evenly over the entire length of the spar cap at the suction side and increasing the load level at which the laminate collapses. This increases the life time of the wind turbine blade and increases the load bearing capacity. This configuration further allows the profile of the trailing edge to be straightened out so that the curvature normally occurring in the trailing edge at the suction side is eliminated or significantly reduced.

The suction side may form a straight line or an approximately straight line along at least a part of the length of the wind turbine blade where the straight line is parallel to the center line of the blade root. This allows the wind turbine blade to extend straight outwards from the rotor hub before curving towards the pressure side. In this configuration, the wind turbine blade may be configured as a straight wind turbine blade where the suction side at the tip end is aligned or substantially aligned with the suction side at the blade root. The tip end may define the outer periphery of a swept area being swept by the wind turbine blades mounted on the rotor hub. The pressure side of this straight wind turbine blade may form a concave surface, unlike the blade of German Utility Model DE 20120324 U1 which has a straight pressure side and a concave suction side.

According to one embodiment, the first line curves towards to the pressure side of the wind turbine blade in at least a part of the length.

This allows the suction side to form a single or multiple curving line which only curves towards the pressure side along the length of the wind turbine blade or at least a part thereof. In this configuration, the wind turbine blade may be configured as a pre-bent wind turbine blade where the tip end is offset towards the pressure side relative to the suction side at the blade root. The wind turbine blade thereby forms a convex surface at the suction side and a concave surface at the pressure side. This reduces the risk of the tip end hitting the wind turbine tower during rotation, since the distance from the tip end to the wind turbine tower is increased by pre-bending the wind turbine blade. The swept area by the wind turbine blades may be increased, since the wind pressure pushes the tip end backwards and thereby straightens the blade profile in the longitudinal direction. The surface of suction side may be offset according to the radii curved line between an intermediate cross-sectional profile and the tip end, thereby reducing the pre-bent section and optionally the offset of the tip end. The surface of the suction side between the blade root and the intermediate cross-sectional profile may form a straight line, as mentioned above. The pre-bent section may start at a relative length of 0.40±10% or less, preferably at 0.04±10%. The wind turbine blade has a relative length from blade root to tip end of 1. This blade configuration is able to capture the wind more effectively and thereby provide a higher energy yield per cost unit of the turbine.

According to one embodiment, the surface of the pressure side of the cross-sectional profiles is offset relative to the surface of the pressure side at the blade root in a direction towards the suction side as function of the relative length of the wind turbine blade.

This allows the pressure side of the cross-sectional profiles to be offset towards the suction side so that it follows the length of the wind turbine blade. The distance between the suction side and pressure side defines the thickness distribution of the blade profile. This allows the surface of the pressure side to cross the center line of the blade root at least once along the length of the wind turbine blade, since the cross-sectional profiles are aligned according to their suction side. The surface of the pressure side may cross the center line of the blade root at relative length of 0.37±10%. The center line may continue to be offset towards the suction side until a predetermined point where the pre-benting, i.e., the offset of the suction side, causes the offset to change direction so that the center line afterwards is offset towards the pressure side.

According to one embodiment, the maximum offset of the pressure side towards the suction side is 988 mm±10% at a relative length of 0.45±10%.

This point occurs if the wind turbine blade is configured as a pre-bent blade. If the wind turbine blade is not pre-bent, then the pressure side will continue to be offset towards suction side until the tip end. The described configuration allows the pressure side to cross the center line of the blade root again at a relative length of 0.52±10%. The point of the maximum offset may occur without the pressure side crossing the center line of the blade root. The pressure side may form a single or multiple curved line where the centers of the inscribed circles defining the curvatures are located towards the pressure side. In this configuration, the According to one embodiment, the offset of the tip end towards the pressure side relative to the suction side at the blade root is between 2 to 4 meters.

This point occurs where the pre-bend of the suction side is at the maximum. The tip end may be configured to allow a more optimal air flow around the tip end and optionally generated less noise at the tip end. The tip end may be configured as a noise reducing tip end which may have a different aerodynamic profile than the rest of the wind turbine blade. One or more flanges extending outwards from the pressure side and/or the suction side may be attached to the tip end. A lightening receiving element may be attached or formed in the tip end. The lightening receiving element may be electrically connected to the ground via a conductive path arranged in the wind turbine.

According to one embodiment, each of the cross-sectional profiles comprises a chord line, where the chord lines of the cross-sectional profiles are positioned in an increasing angle towards the blade root relative to the chord line at or near the tip end as function of the relative length of the wind turbine blade.

This allows the leading edge to be turned or twisted into the direction, thus allowing the angle of attack for each cross-sectional profile to be optimized relative to the direction of the wind, thereby increasing the efficiency of the wind turbine blade.

According to one embodiment, the maximum angle of the chord lines is 30°±10% at a relative length of 0.04±10% relative to the chord line at a relative length of 0.96±10%.

This allows the wind turbine blade to have an optimal angle of attack along the length of the wind turbine blade. The angle may be determined according to the rotational speed of each of the cross-sectional profiles.

According to one embodiment, the thickness distribution and/or the chord distribution of the wind turbine blade are determined as function of the relative length of the wind turbine blade.

This allows the thickness to change from the maximum thickness near the blade root to a gradually smaller thickness along the length of the wind turbine blade. The thickness is defines as the distance from the surface at the suction side to the surface at the pressure side measured perpendicularly to the chord line. The chord of the wind turbine blade may gradually decrease towards the tip end. This allows the cross-sectional profile at the blade root to quickly change into a more aerodynamic profile which is then scaled down towards the tip end.

According to one embodiment, the maximum thickness of the cross-sectional profiles is 1895 mm±10% at a relative length of 0.04 and/or the maximum chord of the cross-sectional profiles is 2668 mm±10% at a relative length of 0.20±10%.

The thickness may also be determined as a relative thickness calculated according to the maximum chord of the cross-sectional profiles. The maximum thickness at the relative length of 0.04 equals a relative thickness of 0.71±10%.

According to one embodiment, the wind turbine blade has a length between 45 m and 50 m.

This allows the length of the wind turbine blade to be adapted to the desired power outage of the wind turbine and the desired swept area. The wind turbine blade has a length between 45 m and 50 m, between 47.5 m and 49.5 m or between 48.5 m and 49.0 m.

According to one embodiment, the tolerance of the values of the wind turbine blade is no more than ±7.5%.

The tolerances of the cited values may take into account any tolerances occurring during the manufacturing of the wind turbine blade. Some of the tolerance may be reduced when any imperfections in the surfaces of the pressure side and the suction side are grinded down at the end of the manufacturing process. The tolerances of the cited values for the wind turbine blade, i.e., the relative length, thickness, chord, twist and offset, are ±7.5%, ±5%, ±2.5% or ±0%.

According to one embodiment, the wind turbine has a capacity between 1.4 MW and 1.8 MW.

The configuration of the wind turbine blade provides an improved blade design which reduces fatigue loads generated in wind turbines with the described capacity. The capacity may be defined as the rated capacity or the nominal power outage of the wind turbine.

The present invention further relates to a specific method of use, where the wind turbine is used to generate a power output in a low wind speed area having an annual mean wind speed at the height of the rotor hub below $6.5^m/_s$.

This wind turbine configuration provides a blade design which is more aerodynamically efficient in a geographic area falling within the low wind speed class (IEC III) according to the IEC standard. The low wind speed area has an annual mean wind speed at the height of the rotor hub below $6.5^m/_s$, $6^m/_s$, $5.5^m/_s$, $5^m/_s$, $4.5^m/_s$, $4^m/_s$ or $3.5^m/_s$. The wind turbine is well-suited to be placed in the low wind speed area and operated according to the wind speeds of that area. The operation of wind turbine, i.e., at least the drive train, the blade pitch system and the rotation speed of the rotor, is optimized to increase the efficiency and power outage of the wind turbine.

The blade root comprises a plurality of connecting elements arranged near the periphery of the blade root. The connecting elements are configured to be mounted to a plurality of receiving connecting elements, e.g., holes, arranged on at the rotor hub. The connecting elements may be configured as T-bolts or studs which are configured to be mounted to or glued into the blade root. Alternatively, the T-bolts or studs may be arranged in the rotor hub instead. Between 60 and 70 sets, preferably between 64 and 66 sets, of connecting elements may be arranged along the periphery of the blade root. The use of T-bolts allows for an easy mounting to the rotor hub and the T-bolts have a high reliability for static and fatigue loads. The bolts further allow for an increased pre-tensioning of the bolts which reduces the need for constant tightening of the bolts during maintenance and reduces the risk of the bolts becoming loose during operation. The bolts may form a bolt circle having a diameter, e.g., of 1800 mm±10%, which is more or less the same as the maximum thickness of the wind turbine blade.

The invention is described by example only and with reference to the drawings, wherein.

BRIEF DESCRIPTION OF THE DRAWINGS

DETAILED DESCRIPTION OF THE INVENTION

In the following text, the figures will be described one by one and the different parts and positions seen in the figures will be numbered with the same numbers in the different figures. Not all parts and positions indicated in a specific figure will necessarily be discussed together with that figure.

Figure 3:
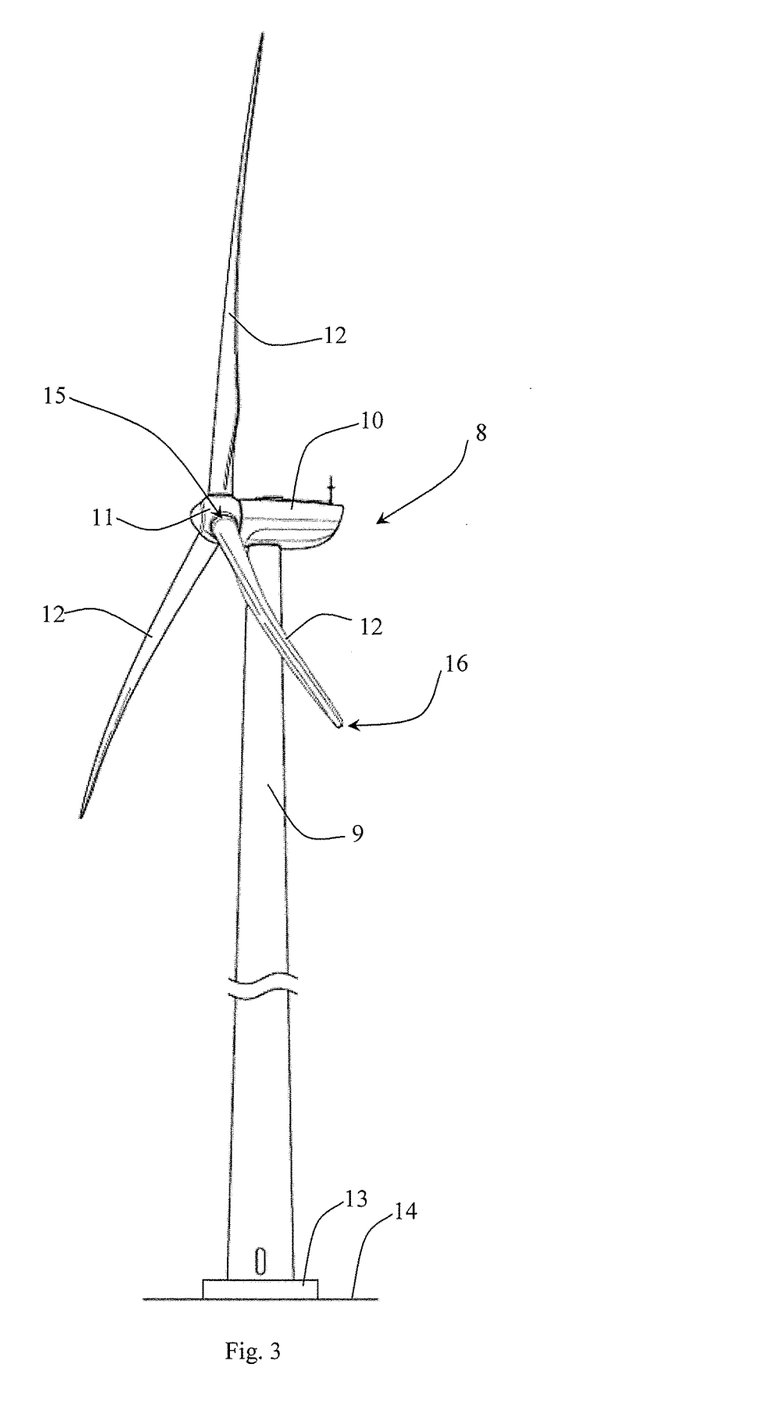
FIG. 3 shows an exemplary embodiment of a wind turbine.

FIG. 3 shows an exemplary embodiment of a wind turbine 8 comprising a wind turbine tower 9 and a nacelle 10 mounted at top of the wind turbine tower 9. The wind turbine tower 9 may comprise one or more tower sections mounted on top of each other. A rotor hub 11 may be rotatably mounted to the nacelle 10 via a rotor shaft. One or more wind turbine blades 12 may be mounted to the rotor hub 11 via a shaft extending outwards from the center of the rotor hub. Two or three wind turbine blades 12 may be mounted to the rotor hub 11 where the wind turbine blades 12 form a rotation plane. The wind turbine tower 9 may be mounted onto a platform or foundation 13 extending above a ground level 14.

The wind turbine blade 12 may comprise a blade root 15 configured to be mounted to the rotor hub 11. The wind turbine blade 12 may comprise a tip end 16 arranged at the free end of the blade 12. The wind turbine blade 12 has an aerodynamic profile along the length of the blade. The wind turbine blade 12 may be made of fiber reinforced plastics or composites, e.g., having fibers made of glass, carbon or organic fibers, which form a laminate. The laminate may be infused using a resin, e.g., epoxy, supplied by an external system, e.g., a vacuum infusion system.

The blade root 15 may comprise a plurality of connecting elements (not shown) arranged near the periphery of the blade root 15. The connecting elements may be configured to be mounted to a plurality of receiving connecting elements, e.g., holes, arranged in at the rotor hub 11. The connecting elements may be configured as T-bolts or studs which are configured to be mounted to or glued into the blade root 15 and mounted to the rotor hub 11.

Figure 4:
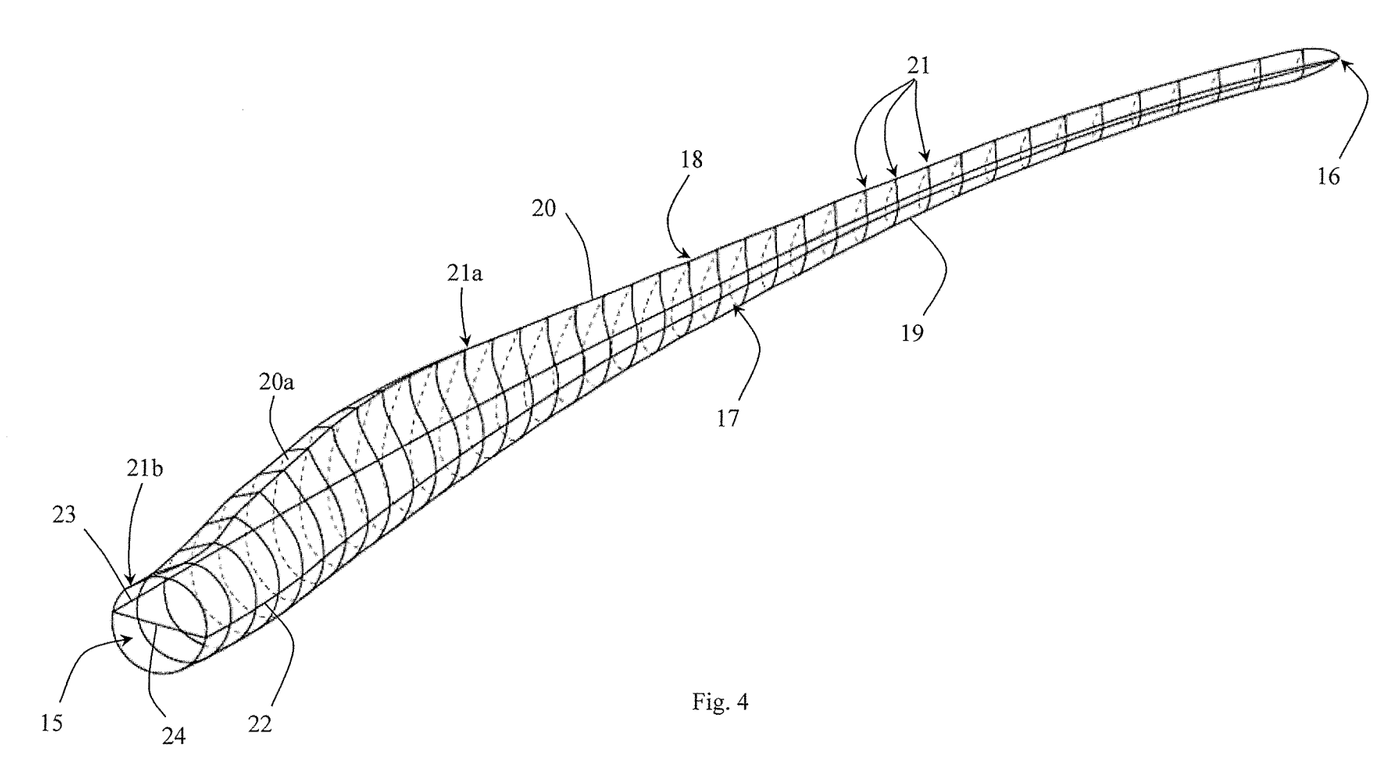
FIG. 4 shows a sketch of a first embodiment of a wind turbine blade according to invention.

FIG. 4 shows a sketch of a first embodiment of the wind turbine blade 12 according to the invention. The wind turbine blade 12 may comprise a pressure side 17 and a suction side 18 which are connected to each other by a leading edge 19 and a trailing edge 20. The wind turbine blade 12 may comprise a plurality of cross-sectional profiles 21 forming the outer surfaces of the pressure side 17 and the suction side 18. The cross-sectional profiles 21 may be arranged along the length of the wind turbine blade 12. The trailing edge 20 may be shaped as a truncated profile forming a flat back panel 20a extending from a first cross-sectional profile 21a at or near the blade root 15 to a second cross-sectional profile 21b located at a distance from the tip end 16, as shown in the figure. The trailing edge 20 may be shaped as a thin outwards extending profile extending from the second cross-sectional profile 21b to the tip end 16.

One or more spar caps (not shown) may be arranged along the length or at least a part of the length at the pressure side 17 and the suction side 18. The spar caps may be integrated or encapsulated into the shell parts forming the pressure side 17 and the suction side 18. One or more support elements in the form of shear webs (not shown) may be arranged between the spar caps. The shear webs may be formed as part of the spar caps or connected to the spar caps via an adhesive.

In a preferred embodiment, the wind turbine blade 12 may have a length from the blade root 15 to the tip end between 48.5 m and 49.0 m which equals a relative length of 1.00 where 0.00 defines the length at the blade root 15. The cross-sectional profiles 21 of the wind turbine blade 12 may be configured to have a maximum thickness of 1895 mm±10% at a relative length between 0.00 and 0.04±10%, preferably at 0.04±10%. The cross-sectional profiles 21 of the wind turbine blade 12 may be configured to have a maximum chord of 2668 mm±10% at a relative length of 0.20±10%. The flat back panel 20a may form two edges connected to the outer surfaces of the pressure side 17 and the suction side 18 respectively where the chord line (not shown) of the cross-sectional profiles 21 may be defined as the line extending through the leading edge 19 and the edge located furthest away from the leading edge 19.

Figure 5:
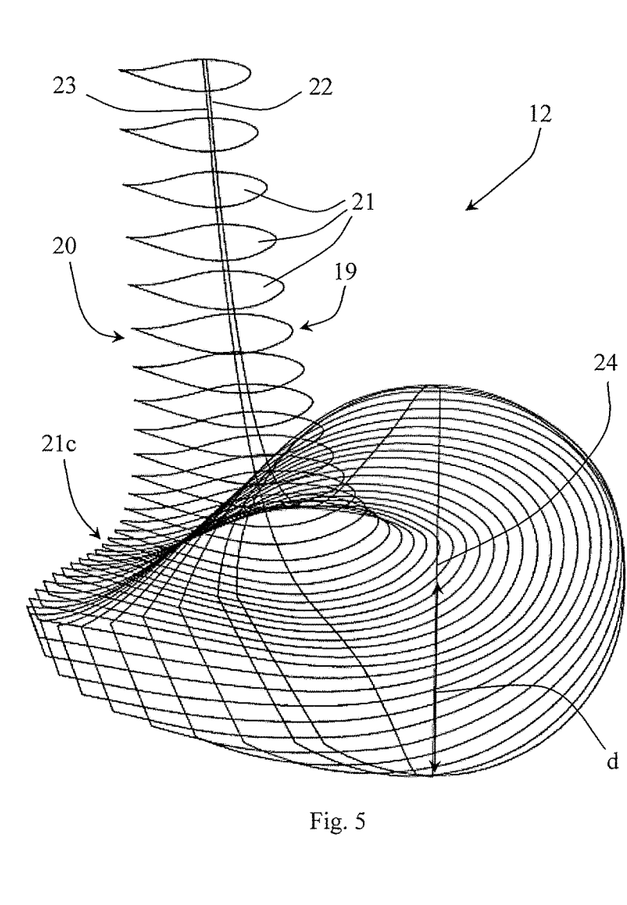
FIG. 5 shows a first embodiment of the cross-sectional profiles of the wind turbine blade shown in FIG. 4 where the suction side is not offset.

FIG. 5 shows a first embodiment of the cross-sectional profiles 21 of the wind turbine blade 12 shown in FIG. 4 where the suction side 18 is not offset. The cross-sectional profiles 21 are seen from the blade root 15 towards the middle of the wind turbine blade 12. A first line 22 may extend along the outer surface of the pressure side 17 and may be connected to each of the cross-sectional profiles 21. A second line 23 may extend along the outer surface of the suction side 18 and may be connected to each of the cross-sectional profiles 21. The first line 22 and the second line 23 may define the center line of the spar caps which extend along the length of wind turbine blade 12. In this embodiment, the second line 23 may form an S-shaped curvature located near the blade root 15, where the line 23, as seen from the blade root 15, first curves towards the pressure side 17 then curves towards the suction side 18. The other line 22 also forms an S-shaped curvature where the line 22 has the same curvature as the line 23, but inverted. A third line 24 may define the thickness of the cross-sectional profiles 21 (only the thickness at the blade root 15 is shown) between the outer surfaces of the pressure side 17 and the suction side 18. In this embodiment, the spar caps may follow the curvature of the lines 22, 23.

The wind turbine blade 12 may be configured as a pre-bent wind turbine blade where the tip end 16 may be offset in a direction towards the pressure side 17. At least a part of the wind turbine blade 12 may be pre-bent in a direction towards the pressure side 17. The line 23 may form a radii curved line which curves towards the pressure side 17 between an intermediate cross-sectional profile 21c and the tip end 16. In this embodiment, the intermediate cross-sectional profile 21c may be located after the S-shaped curvature of the first and second lines 22, 23.

The wind turbine blade 12 may be configured as a twisted wind turbine blade where the blade root 15 may be twisted relative to the tip end 15, or vice versa. The chord line of the cross-sectional profiles 21 may be positioned in an increasing angle relative to the chord line of the blade root 15. The flat back panel 20a may follow the twist of the cross-sectional profiles along its length.

Figure 6:
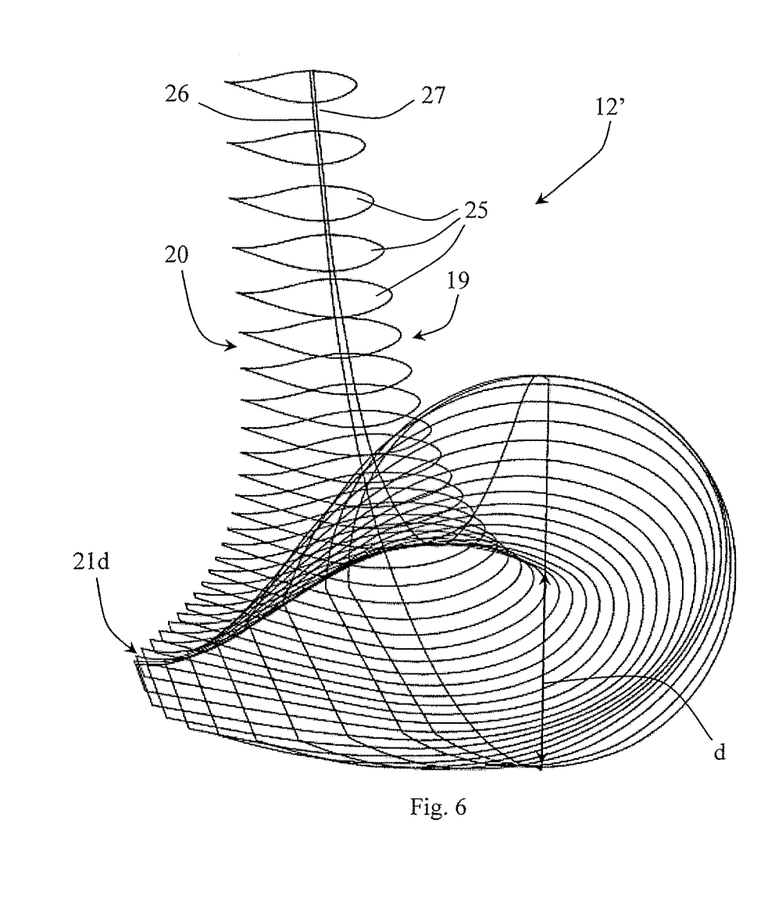
FIG. 6 shows a second embodiment of the cross-sectional profiles of the wind turbine blade shown in FIG. 4 where the suction side is offset.

FIG. 6 shows a second embodiment of the cross-sectional profiles 25 of the wind turbine blade 12' shown in FIG. 4 where the suction side 18 is offset relative to the suction side of the blade root 15. In this embodiment, the cross-sectional profiles 25 may be aligned according to the suction side 18 instead of being aligned according to the center line of the blade root 15, as illustrated in FIG. 5. The outer surface of cross-sectional profiles 25 may be aligned so that the spar cap integrated or encapsulated in the suction side 18 form a straight spar cap extending along the length of the wind turbine blade 12'. The spar cap is configured so that the compression load generated in the suction side 18 may be distributed along the entire length of the spar cap instead of being accompanied with load bending loads as is the case with the spar cap shown in FIG. 5. The straight spar cap may form a straight line 26 extending from the blade root 15 to the tip end 16. The spar cap integrated or encapsulated in the pressure side 17 may be configured to form an S-shape curvature where the two curving points may be configured to follow the thickness distribution of the wind turbine. In this embodiment, the spar cap may form a larger and/or different S-shaped curvature than the S-shaped curvature shown in FIG. 5. The spar cap located in the pressure side 17 may form a line 27 following the curvature of the spar cap along the length of the wind turbine blade 12.

The wind turbine blade 12' may be configured as a pre-bent wind turbine blade where the tip end 16 may be offset in a direction towards the pressure side 17. At least a part of the wind turbine blade 12' may be pre-bent in a direction towards the pressure side 17. The line 26 may form a radii curving line which curves towards the pressure side 17 between an intermediate cross-sectional profile 21d and the tip end 16. The line 26 may form a straight line between the blade root 15 and the intermediate cross-sectional profile 21d. In this embodiment, the intermediate cross-sectional profile 21d may be located closer to the blade root 15 than the same profile or point shown in FIG. 5.

The wind turbine blade 12' may be configured as a twisted wind turbine blade where the blade root 15 may be twisted relative to the tip end 15, or vice versa. The chord line of the cross-sectional profiles 25 may be positioned in an increasing angle relative to the chord line of the blade root 15. The flat back panel 20a may follow the twist of the cross-sectional profiles 25 along its length.

In a preferred embodiment, the cross-sectional profiles 25 of the wind turbine blade 12' may be configured to have a pressure side 17 that is maximum offset towards to the suction side 18 of 988 mm±10% at a relative length of 0.45±10% relative to the pressure side 17 at the blade root 15. The offsetting of the pressure side 17 may be configured to cross the center line of the blade root 15 at a relative length of 0.37±10% and again at 0.52±10%. The tip end 16 of the wind turbine blade 12 may be configured to be positioned in an offset between 2 to 4 meters, e.g., between 2.5 to 3.5 meters, e.g., 3 meters, measured at a relative length of 0.98±10% or 0.96±10% relative to the suction side 18 at the blade root 15. The cord lines of the wind turbine blade 12' may be configured to be positioned in a maximum twist angle of 34°±10% at a relative length of 0.00 relative to the chord line at the tip end 16 or of 30°±10% at a relative length of 0.04±10% relative to the chord line at a relative length of 0.96±10%.

FIG. 7 shows a graph of the distance, d, of the suction side 18 and the pressure side 17 relative to the length, 1, of the wind turbine blades 12, 12' shown in FIGS. 5 and 6. The x-axis represents the length of the wind turbine blade 12, 12' measured in meters from the center of the rotor hub 11. The y-axis represents the distance from a center line 28 at the blade root 15 to the outer surface of the suction side 18 measured in meters. The line 26 (marked with squares) represents the outer surface of the suction side 18 for the blade profile shown in FIG. 6. The line 27 (marked with squares) represents the outer surface of the pressure side 17 for the blade profile shown in FIG. 6. The lines 26, 27 extend along the middle of the spar caps arranged along the length of the wind turbine blade 12'. The line 23 (marked with triangles) represents the outer surface of the suction side 18 for the blade profile shown in FIG. 5. The line 22 (marked with triangles) represents the outer surface of the pressure side 17 for the blade profile shown in FIG. 5. The lines 22, 23 extend along the middle of the spar caps arranged along the length of the wind turbine blade 12.

As shown in line 26, the cross-sectional profiles 25 may first be offset towards the suction side 18 relative to the blade root 15 so that the line 26 of the spar cap in FIG. 6 may form a straight line before entering the pre-bent section. The line 23 of the spar cap in FIG. 5 may form an S-shaped curved line before entering its pre-bent section, as shown in FIG. 7. Both lines 23, 26 may form a radii curved line curving towards the pressure side 17 in the pre-bent sections. The spar cap of FIG. 6 may form a radii curving line or unidirectional line which only curves towards to pressure side 17 whereas the spar cap of FIG. 5 may form a double radii curving line or bidirectional line which curves both towards the pressure side 17 and the suction side 18. As shown in lines 22, 27, the cross-sectional profiles 25 may form an S-shaped spar cap at the pressure side 17 for both blade profiles shown in FIGS. 5 and 6. The line 27 of the spar cap at pressure side 17 may be configured to cross the center line 28 of the blade root at least once, as shown in FIG. 7. The offset of the pressure side 17 may change direction at a point 27a defining the maximum offset of the pressure side 17.

Due to the offsetting of cross-sectional profiles 25 towards the suction side 18, the line 26 of the spar cap in FIG. 6 may have a wider pre-bent section than the line 23 of the spar cap in FIG. 5.

In a preferred embodiment, the suction side 18 of the wind turbine blade 12' shown in FIG. 6 may be configured to enter the pre-bent section at a relative length of 0.04±10%. The suction side 18 of the wind turbine blade 12 shown in FIG. 5 may be configured to enter the pre-bent section at a relative length of 0.40±10%.

Depending on the desired configuration of the support elements arranged inside the wind turbine blade 12' and the selected manufacturing process, the tolerances of the dimensions (thickness, chord, twist) and lengths (relative lengths) may be of ±10% or less.

Tests have shown that the embodiment of the wind turbine blade 12' described in reference to FIGS. 6 and 7 is particularly well suited for wind turbines 8 having a capacity, e.g., a rated capacity or nominal power outage, between 1.4 MW and 1.8 MW. Tests have furthermore shown that the described wind turbine blade 12' in reference to FIGS. 6 & 7 is particularly well suited for geographic locations having an annular mean wind speed at the height of the rotor hub 11 of $6.5^m/_s$ or less. The height is defined as the distance from the center of the rotor hub 11 to the upper surface of the foundation 13.

Figure 8:
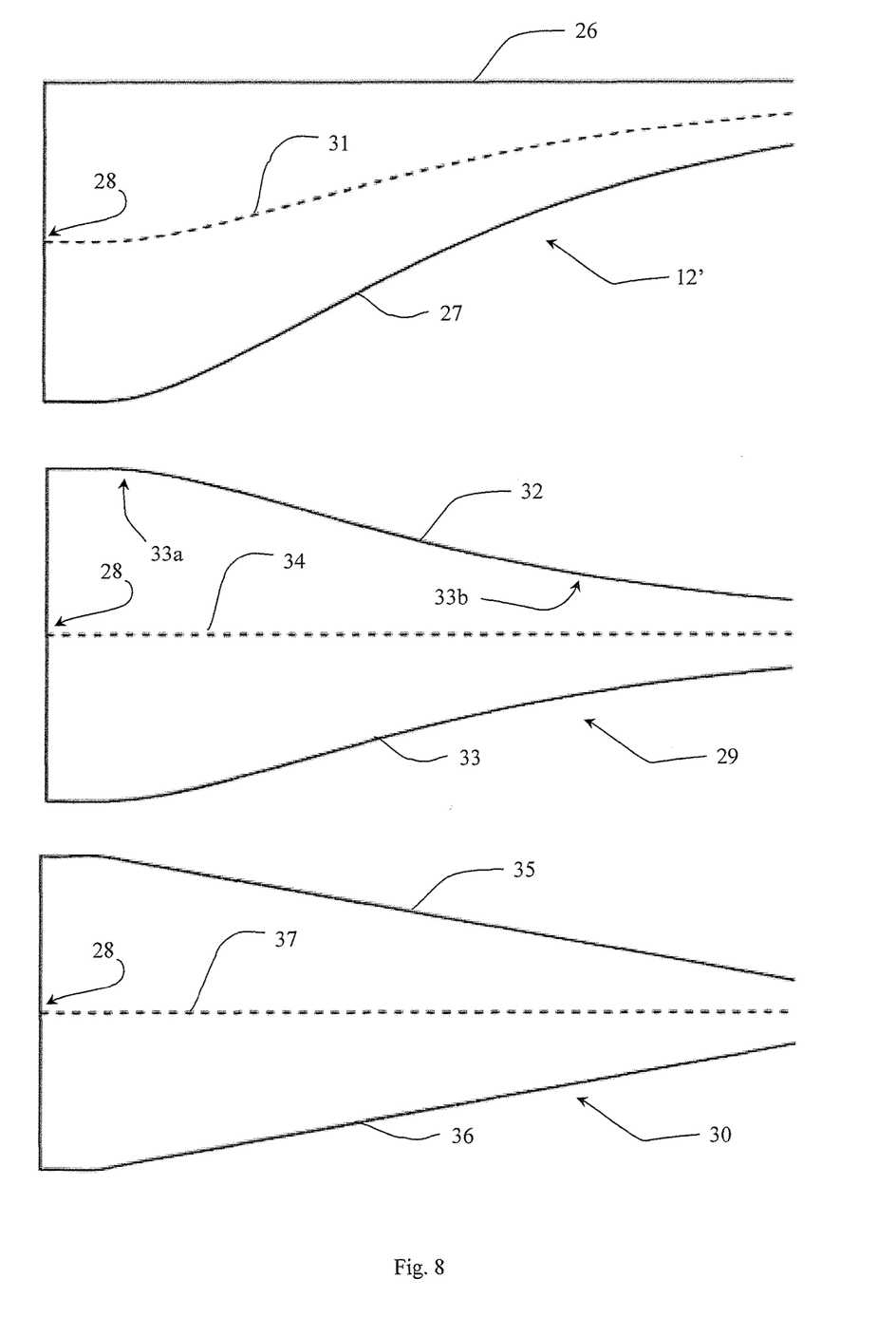
FIG. 8 shows a span-wise cut-out of the wind turbine blade shown in FIG. 4 compared to the same cut-out of two known wind turbine blades.

FIG. 8 shows a span-wise cut-out of the wind turbine blade 12' compared to the same cut-out of two known wind turbine blades 29, 30. The cross-sectional profiles of the wind turbine blade 12' are aligned according to the suction side 26, as shown in FIG. 8. The suction side defined by the line 26 form a planar surface extending along the length of the wind turbine blade 12'. The pressure side defined by the line 27 form a concave surface extending along the length of the wind turbine blade 12'. The center line 31 of the blade profile extends through the center of the inscribed circle of each cross-sectional profile and is offset towards the suction side 26 relative to the center line 28 of the blade root. The center line 31 forms a more or less S-shaped or concave line extending along the blade profile, as shown in FIG. 8.

The wind turbine blade 29 forms a traditional blade profile where the cross-sectional profiles are aligned according to the center line 28 of the blade root, such as disclosed in International Patent Application WO 99/14490 A1 and corresponding U.S. Pat. No. 6,582,196 B1. Both the suction side 32 and the pressure side 33 of the wind turbine blade 29 form a more or less concave surface extending along the length of the wind turbine blade 29, as shown in FIG. 8. The center line 34 of this blade profile forms a straight line extending along the length of the wind turbine blade 29.

The wind turbine blade 30 forms a wedge-shaped blade profile, such as disclosed in U.S. Pat. No. 7,832,985 B2 without the pre-bending of the outermost blade section. Both the suction side 35 and the pressure side 36 of the wind turbine blade 30 form a declining surface extending along the length of the wind turbine blade 30, as shown in FIG. 8. The blade profile of this wind turbine blade 30 forms a straight line extending along the length of the wind turbine blade 30.

Both the wind turbine blade 12' and the wind turbine blade 29 form a relative short transition area where the blade profile relatively quickly changes from a circular or elliptical profile to more aerodynamic optimized profile. The blade profile of wind turbine 12' provides a more even distribution of the compression load at the suction side 26 whereas the compression loads of the wind turbine blade 29 is accompanied by local laminate bending due to changes in the spar cap curvature at the points 33a, 33b. The blade profile of the wind turbine blade 30 forms a relative long transition area where the blade profile slowly changes into a more aerodynamic profile, as shown in FIG. 8.

What is claimed is:

1. A wind turbine comprising:
   a wind turbine tower;
   a nacelle provided on the wind turbine tower;
   a rotor hub rotatably mounted to the nacelle;
   at least one wind turbine blade having a blade root configured to be mounted to the rotor hub and having a tip end, the wind turbine blade further comprising a pressure side and a suction side connected to each other via a leading edge and a trailing edge, and the wind turbine blade having a length of 1 from the blade root to the tip end;
   wherein
   the wind turbine blade further comprises a plurality of cross-sectional profiles arranged along the length of the wind turbine blade, the peripheries of the cross-sectional profiles defining an outer surface of the suction side and an outer surface of the pressure side; and
   wherein the cross-sectional profiles are arranged along the length of the wind turbine blade with a middle of each of the cross-sectional profiles on the outer surface of the suction side arranged to form a first line having at least one predetermined finite curvature, and where a center of a circle inscribed in each of the cross-sectional profiles form a center line that is offset relative to the center of the blade root and in a direction towards the suction side.

2. A wind turbine according to claim 1, wherein the first line curves towards to the pressure side of the wind turbine blade in at least a part of the length.

3. A wind turbine according to claim 2, wherein the surface of the pressure side of the cross-sectional profiles is offset relative to the surface of the pressure side at the blade root in a direction towards the suction side as function of the relative length of the wind turbine blade.

4. A wind turbine according to claim 3, wherein the maximum offset of the pressure side towards to the suction side is 988 mm±10% at a relative length of 0.45±10%.

5. A wind turbine according to claim 2, wherein the offset of the tip end towards the pressure side relative to the suction side at the blade root is between 2 to 4 meters.

6. A wind turbine according to claim 1, wherein each of the cross-sectional profiles comprises a chord line, where the chord lines of the cross-sectional profiles are positioned in an increasing angle with the blade root relative to a chord line of a profile at or near the tip end as function of the relative distances of the cross-sectional profiles from the root compared with the length of the wind turbine blade.

7. A wind turbine according to claim 6, wherein the maximum angle of the chord lines is 30°±10% at a relative length of 0.04±10% relative to a chord line of a profile at a relative length of 0.96±10%.

8. A wind turbine according to claim 1, wherein the thickness distribution of the wind turbine blade are determined as function of the relative distance from the root as compared with the length of the wind turbine blade.

9. A wind turbine according to claim 8, wherein the maximum thickness of the cross-sectional profiles is 1895 mm±10% at a relative length of 0.04.

10. A wind turbine according to claim 1, wherein cross-sectional profiles chord line angles around the center of the wind turbine blade are determined as function of the relative length of a profile from a root of the wind turbine blade compared to the length of the blade.

11. A wind turbine according to claim 10, wherein the maximum chord of the cross-sectional profiles is 2668 mm±10% at a relative length of 0.20±10%.

12. A wind turbine according to claim 1, wherein the wind turbine blade has a length between 45 m and 50 m.

13. A wind turbine according to claim 1, wherein the tolerance values of the wind turbine blade is no more than ±7.5%.

14. A wind turbine according to claim 1, wherein the wind turbine has a capacity between 1.4 MW and 1.8 MW.

15. Method of using a wind turbine according to claim 1 to generate an power output in a low wind speed area having an annual mean wind speed at the height of the rotor hub below $6.5^{m/s}$.

16. The wind turbine of claim 1, wherein a maximum thickness of each cross-sectional profile is a function of the relative distance from a root of the wind turbine blade.

17. The wind turbine of claim 1, wherein a chord of each cross-sectional profile is a function of its relative distance from a root of the wind turbine blade.

18. A wind turbine blade comprising:
   at least one wind turbine blade including:
   a blade root,
   a tip end,
   a pressure side and a suction side connected to each other via a leading edge and a trailing edge,
   the at least one wind turbine blade having a length of 1 from the blade root to the tip end,
   a plurality of cross-sectional profiles along the length of the wind turbine blade,
   peripheries of each of the plurality of cross-sectional profiles defining a suction side outer surface and a pressure side outer surface,
   the cross-sectional profiles along the length of the wind turbine blade having a center of each of the cross-sectional profiles on the suction side outer surface forming a first line having at least one predetermined finite curvature and extending along the middle of at least one support element arranged along the length of the suction side outer surface, and a center of each of the plurality of cross-sectional profiles form a center line offset relative to a center of the blade root and offset towards the suction side.

\* \* \* \* \*